United States Patent [19]

Lekhtman

[11] Patent Number: 5,492,074
[45] Date of Patent: Feb. 20, 1996

[54] SAILING ARRANGEMENT

[75] Inventor: David Lekhtman, Morin Heights, Canada

[73] Assignee: Windsaucer Corporation, Montreal, Canada

[21] Appl. No.: 159,089

[22] Filed: Nov. 29, 1993

[51] Int. Cl.⁶ .................................................. B63B 35/00
[52] U.S. Cl. .......................... 114/39.1; 114/39.2; 114/61
[58] Field of Search ................................. 114/39.1, 39.2, 114/91, 102, 103, 61, 123, 274, 292, 283, 290, 291

[56] References Cited

U.S. PATENT DOCUMENTS 3,858,542  1/1975  Lenoble .
4,401,047  8/1983  Auras ................................. 114/39.1
4,653,417  3/1987  White ................................. 114/61
4,708,076  11/1987 Lekhtman ........................... 114/91
4,757,777  7/1988  Rosenberger .
4,831,950  5/1989  Allured .
4,864,949  9/1989  Olsen .
5,119,748  6/1992  Nishimura ........................... 114/39.2

Primary Examiner—Stephen Avila
Attorney, Agent, or Firm—Fishman, Dionne & Cantor

[57] ABSTRACT

A pair of pontoons are connected together in spaced arrangement by a bridge. A hammock, for supporting the user of the sailing arrangement, is disposed between and above the pontoons. A framed sail is attached to the pontoons such that the attitude and direction of the sail can be manipulated by the user. For this purpose, handles are provided on the underside of the sail and the user grasps the handles to manipulate the sail.

18 Claims, 6 Drawing Sheets

SAILING ARRANGEMENT

BACKGROUND OF INVENTION

1. Field of the Invention

The invention relates to a novel sailing arrangement. More specifically, the invention relates to such an arrangement which includes two spaced bottom members and bridging means for joining the bottom members together, means for supporting a user disposed between the bottom members, and a framed sail connected to said bottom members such that the attitude and direction of the sail can be manipulated by the user.

2. Description of Prior Art

Many different sailing arrangements are known in the art as illustrated in, for example, U.S. Pat. No. 3,858,542, Lenoble, U.S. Pat. No. 4,757,777, Rosenberger, U.S. Pat. No. 4,831,950, Allured and U.S. Pat. No. 4,864,949, Olsen.

The '542 patent teaches a framed sail (see FIGS. 5 and 6) which is held by the user. The sail is not attached to the float, on which the user is shown standing. The sail can be manipulated to quite an extent, and appears to be a precursor to the well known sail board.

Sail '777 patent is supported on a vertical mast. A tripod includes three struts which meet at a juncture to which is mounted the mast. The ends of the struts are connected to three pontoons. The attitude of the sail cannot be varied.

The '950 patent shows a triangular yoke articulated to a pair of pontoons and a vertical mast on a separate float is rotatably supported at the apex of the triangular yoke. The mast supports a framed sail. The sail is maniputated by sheets from a user on the pontoons. The attitude of the sail cannot be varied in this arrangement.

In the '949 patent, a foil sail is carried by flexible A-frame spars. The foil sail is attached to a mast by a V-shaped yoke so that the attitude and direction of the sail is controllable by sheet.

SUMMARY OF INVENTION

It is therefore an object of the invention to provide a novel sail craft.

It is a further object of the invention to provide such a novel sail craft which includes a framed sail, the frame constituting an endless member.

It is a further object of the invention to provide a sail craft wherein the sail can be manipulated in any attitude.

In accordance with the invention there is provided a sail craft comprising;

a pair of elongated bottom members;

bridging means for connecting said bottom members in spaced arrangement;

means for supporting a user of said sailing arrangement, said means for supporting being disposed between and above said bottom members;

a framed sail;

means for attaching said framed sail to said bottom members such that the attitude and direction of said sail can be manipulated by said user.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
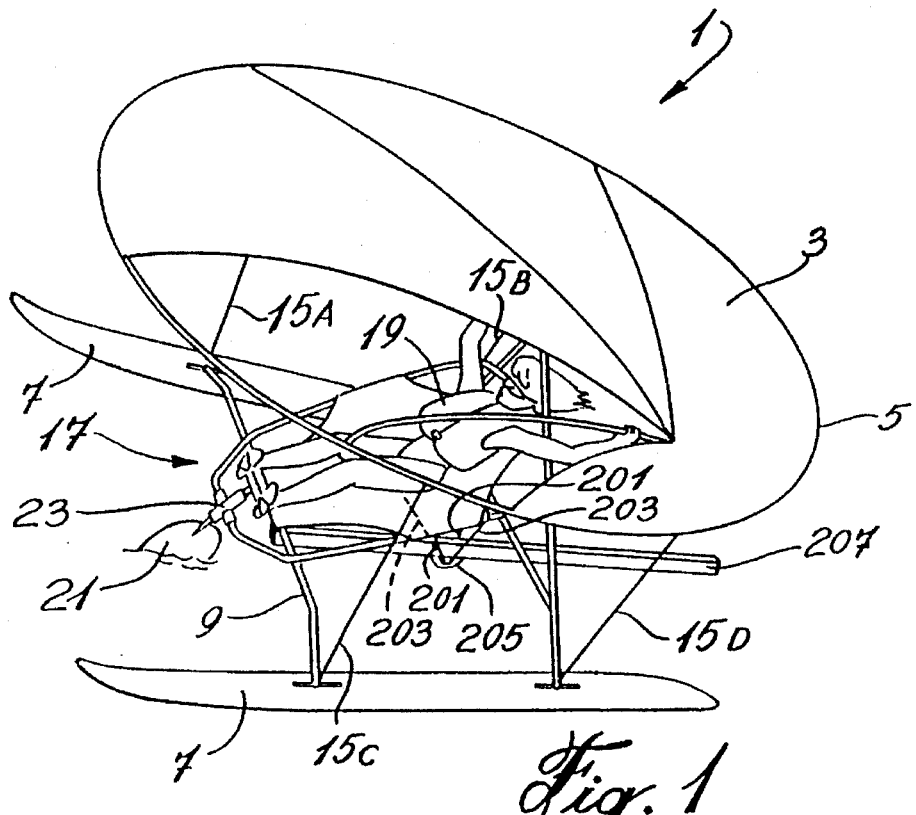
FIG. 1 is a perspective view, partially cut away, of the sail craft showing a user supported in the supporting means.
Figure 3:
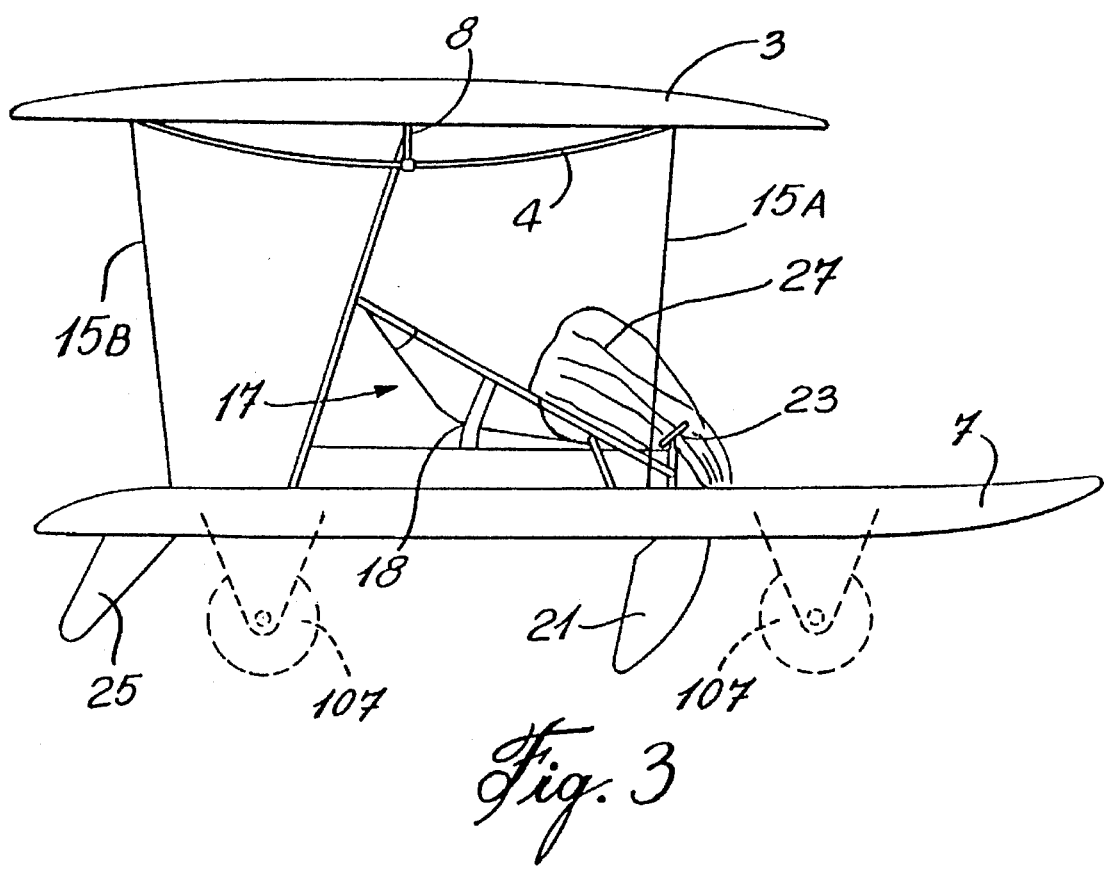
FIG. 3 is a side view of the embodiment of FIG. 1.
Figure 2:
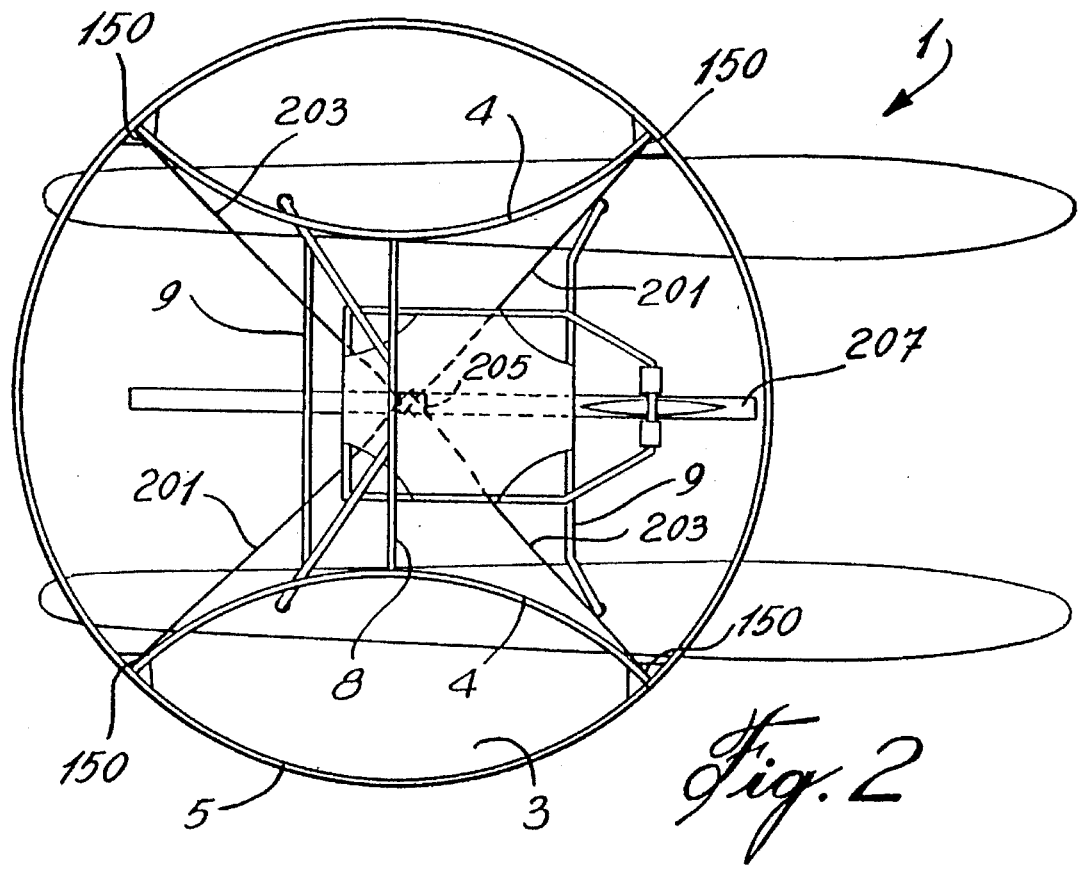
FIG. 2 is a top view of the sail craft in accordance with the embodiments of FIG. 1 with part of the sail cut away.
Figure 8:
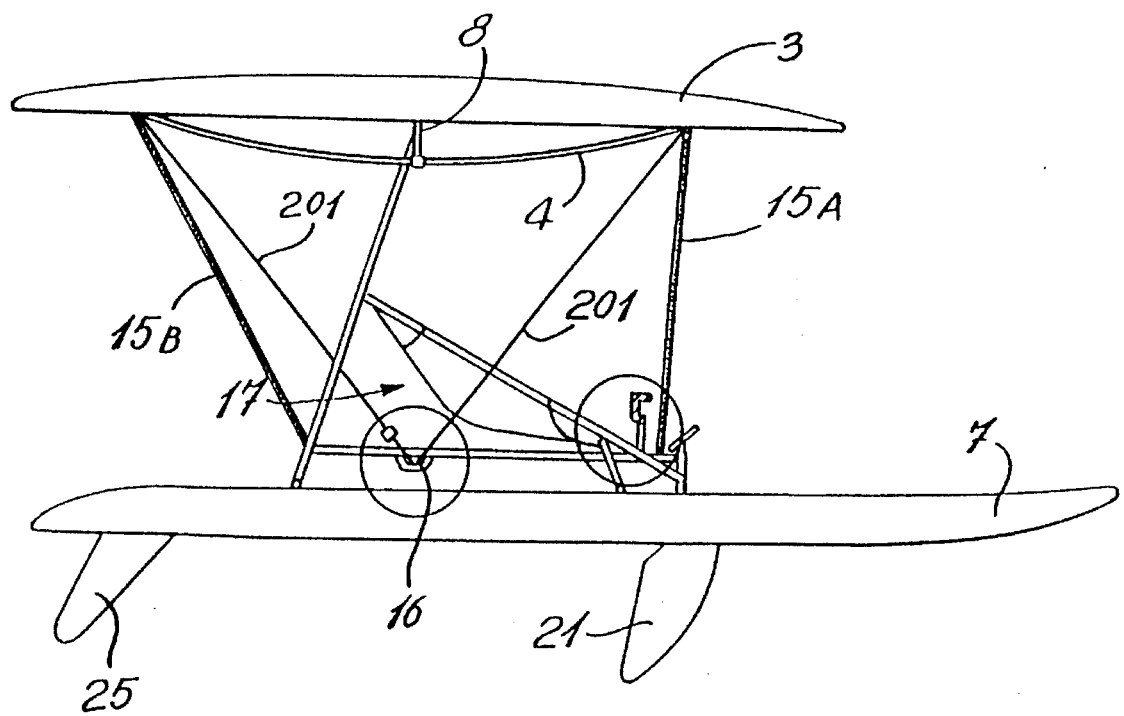
FIG. 8 is a side elevation of an embodiment in accordance with the present invention.
Figure 4:
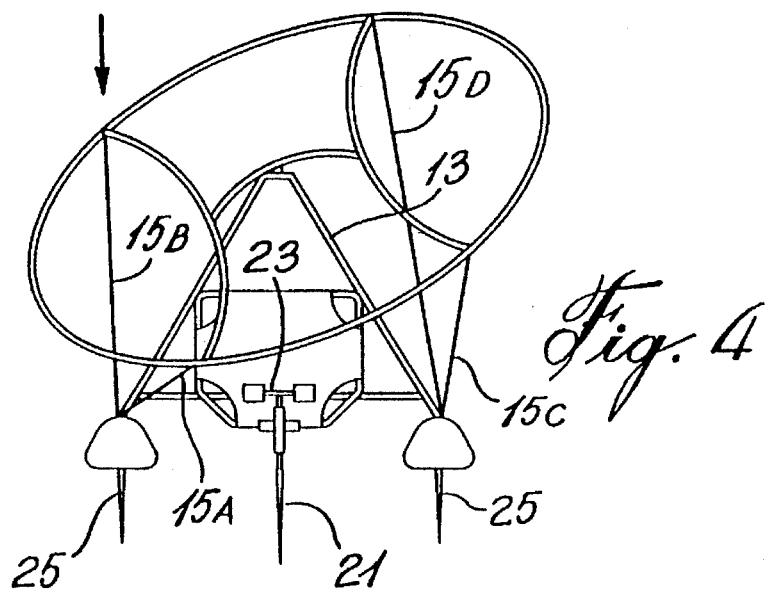
FIGS. 4, 5 and 6 are front elevations of the embodiment of FIG. 1 showing the sail in different attitudes.
Figure 5:
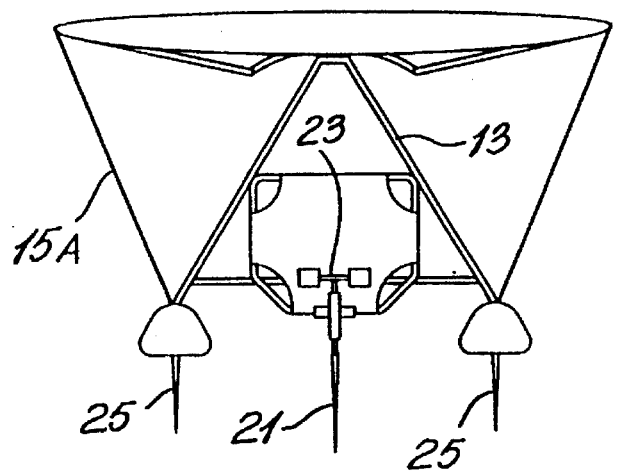
Figure 6:
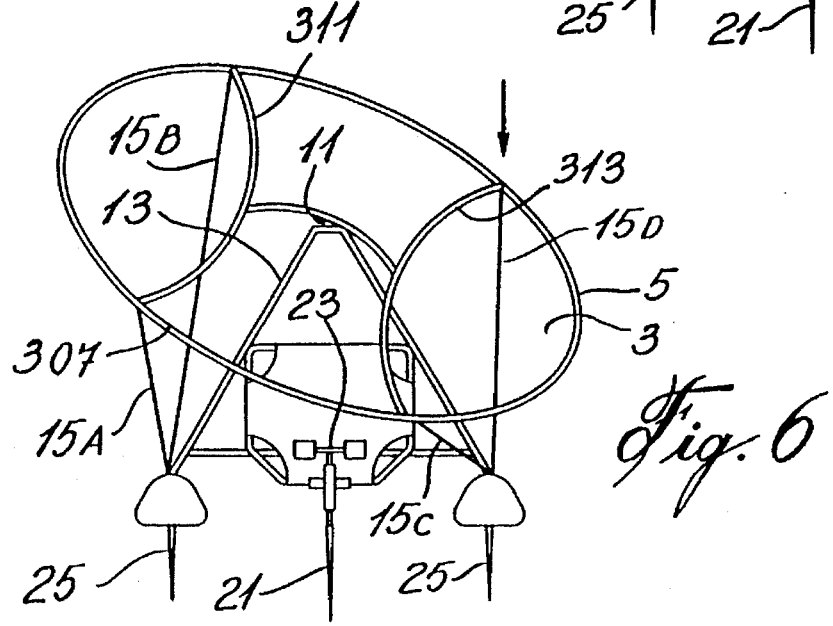

Referring to FIGS. 1, 2 and 3, the sail craft, illustrated generally at 1, comprises a sail member 3 having two bowed struts forming handles 4 extending along the sail. A bar 8 extends between the handles 4 through the geometric center of the circular sail. The sail is contained in an endless frame 5. In the illustrated embodiment, the sail 3 is circular and the endless frame 5, which is mounted on the periphery of the sail, is also circular. My U.S. Pat. No. 4,708,076, which is incorporated herein by reference, shows a similar sail.

The sail craft 1 also includes hulls 7. In the illustrated embodiment, the hulls are in the form of pontoons. The hulls 7 could be adapted with wheels 107, for a land vehicle, as shown in dotted lines in FIG. 3.

A frame including a bridge 9 connects the hulls 7 in spaced, preferably parallel, arrangement.

The sail 3 is connected to the hulls 7 as follows:

A central connection 11 on bar 8 of the sail 3 is pivotally connected to the hulls 7 by a triangular frame member 13 which is better seen in FIGS. 4, 5, 6 and 12.

Figure 12:
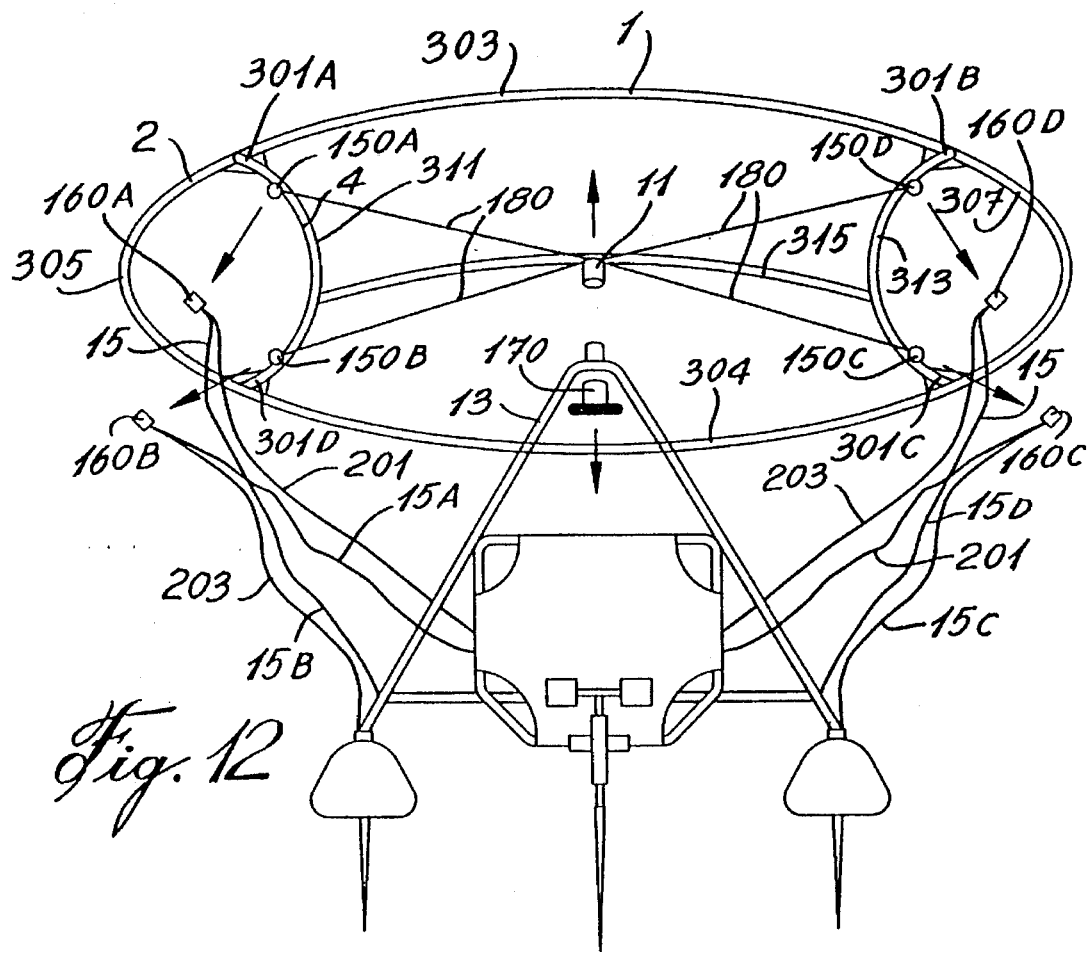
FIG. 12 is a front elevation of an embodiment of the present invention showing the elements in a different operative position.

Four stretchable elongated members 15A, 15B, 15C and 15D (rubber strands) are connected to points 150A, 150B, 150C and 150D (respectively) on the handles 4 as illustrated in FIG. 12. Although the points 150 A to 150D are shown illustrated on the handles in FIG. 13, it will be apparent that these points could be on the frame 2 instead. Connection means 160A, 160B, 160C and 160D are provided at one end of the rubbers 15A, 15B, 15C and 15D for connection to the points 150A, 150B, 150C and 150D. The connection means are detachable as is well known in the art.

Triangular frame member 13 is connected to center connection 11 of the sail by means of a push-to-disconnect arrangement 170 as seen in FIG. 12. Center connection 11 is connected to the means 150 by cords 180. When push-to-disconnect element 170 is pushed, the triangular member 13 will be released from the center connection 11 of the sail 3. At the same time, ends 160 will be released from the means 150 and 152 by the action of pulling cords 180 on means 150 and 152 when element 170 is pushed to release. Thus, in the event of an emergency, the sail 3 can be completely released from the sail craft 1.

Disposed between and above the hulls 7 but below the sail 3 is a seat 17 for supporting a user 19. As seen in FIGS. 1 and 3, one such support means can comprise a hammock 17. As shown in FIG. 3, the hammock 17 may include a seatbelt 18 for strapping the user 19 into the hammock 17. It is also contemplated, in accordance with the invention, to use an airbag 27 for maintaining the user in the hammock 17. It is of course possible to use both the seat belt 18 and the airbag 27 to secure a user in the hammock 17. Alternatively, it may be sufficient to use either one or the other.

Steering means are also provided. For this purpose, there is provided a front steering rudder 21. A foot-operated control means 23 controls the steering fin 21. The foot-operated control means 23 is, of course, operated by the feet of the user 19.

Also provided are left and right rear fins 25, best seen in FIGS. 3, 4, 5 and 6. It is contemplated that the rear fins can also be manipulated by the foot control 23 by attaching the rear fins to the foot control by cables not shown in the present drawings. Alternatively, the fins 25 may be fixed in position and used only as a sailing keel.

Figure 10:
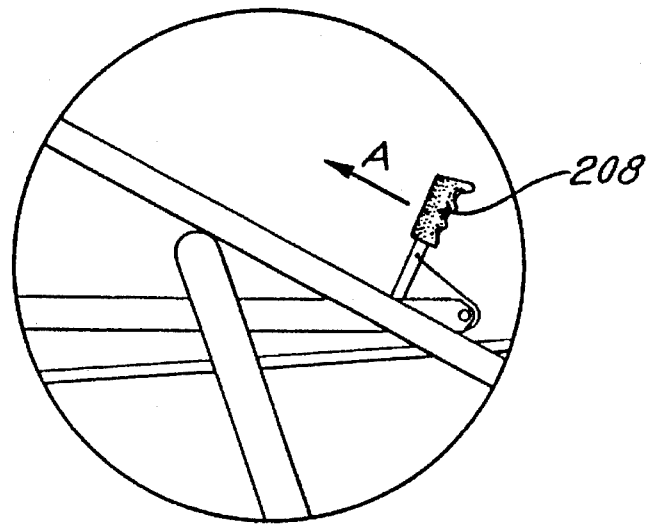
FIG. 10 is an enlarged fragmentary side view of a detail shown in FIG. 8.
Figure 11:
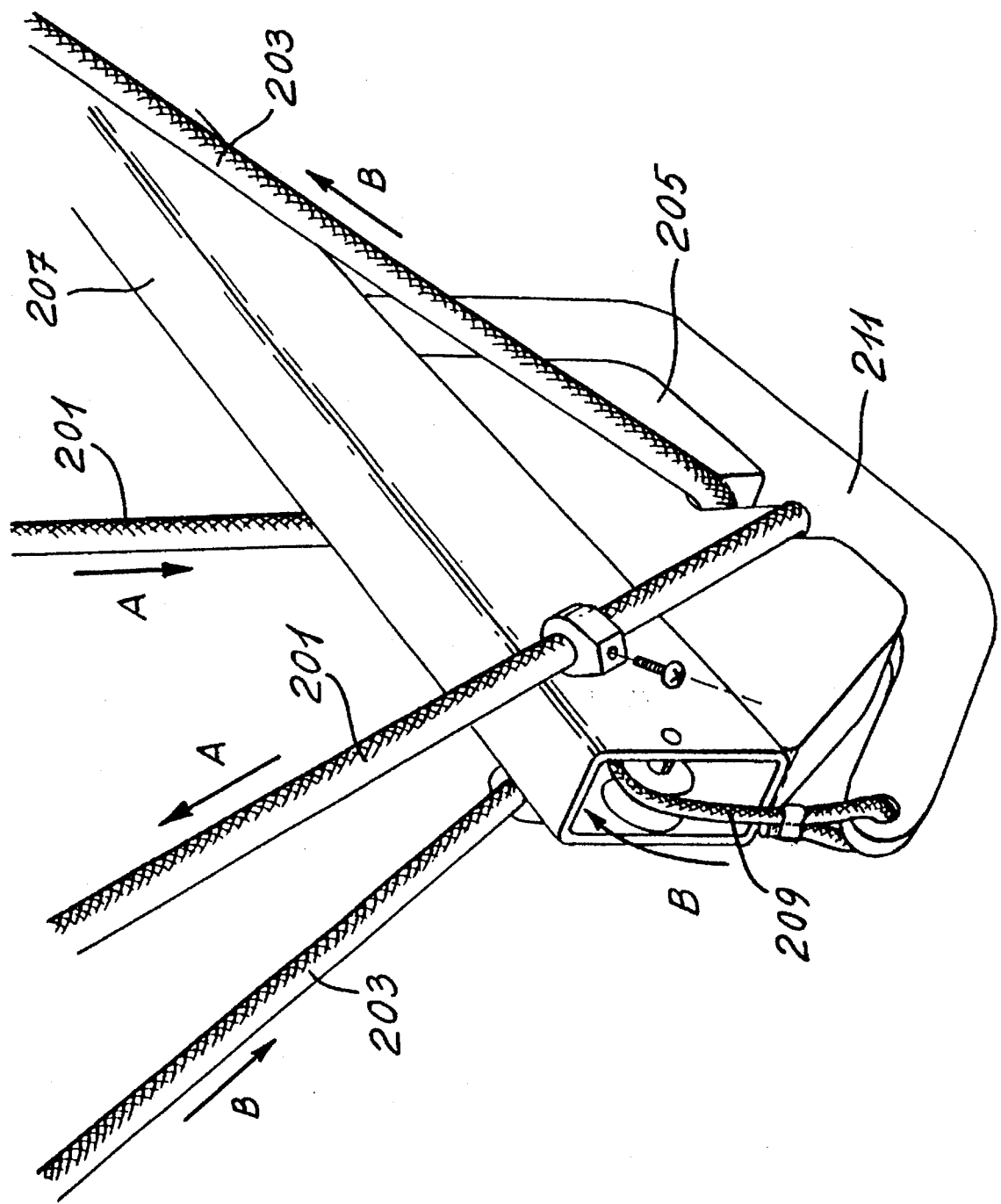
FIG. 11 is a fragmentary enlarged perspective view of a detail shown in FIG. 8.
Figure 13:
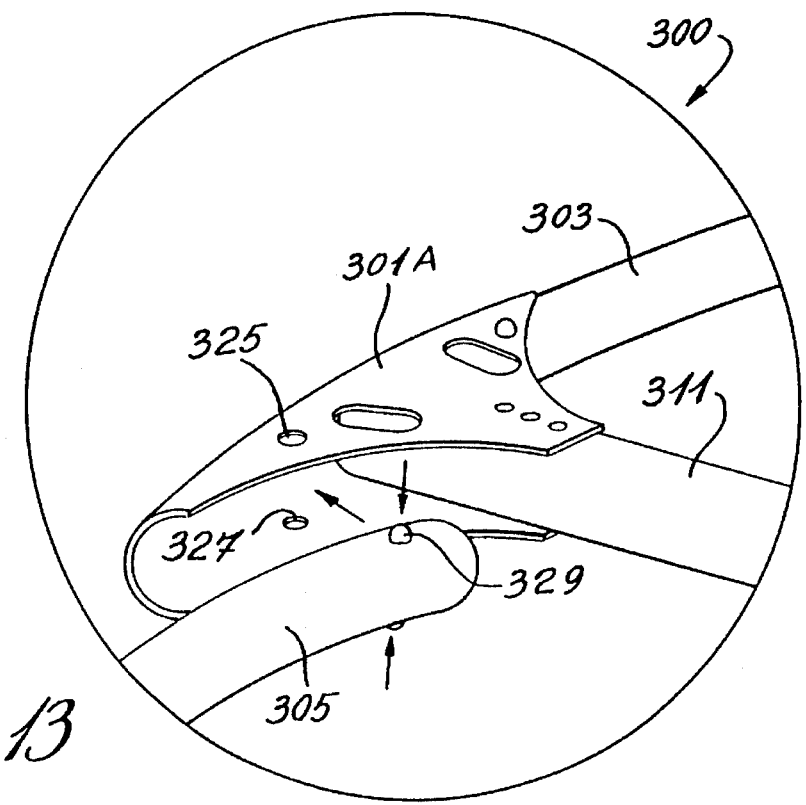
FIG. 13 is a fragmentary enlarged perspective view, partly exploded, of a further embodiment of a detail of the present invention.

Sheets 201 and 203 are provided for manipulating the direction and attitude of the sail 3 as shown in FIGS. 8, 9, 10, 11 and 12. The ends of sheet 201 are connected to opposing points 150C and 150A as shown in FIG. 13, and the ends of sheet 203 are also connected to opposing points 150B and 150D. The sheets 201 and 203 pass through a hook 205. A particular embodiment is illustrated in FIG. 11.

The hook 205 is mounted to beam 207.

As above-described, the elongated stretchable members 15A, 15B, 15C and 15D are also connected to points 150A, 150B, 150C and 150D. Accordingly, the sail 3 will be released from sheets 201 and 203, s well as from rubber strands 15A, 15B, 15C and 15D when 170 is pushed.

When the attitude or direction of the sail 3 is to be manipulated, sheets 201 and 203 on one side of hook 205 will be shortened while the other portions thereof will be lengthened on the other side of hook 205.

To lock the sail 3 in a particular position, there is provided a handle 208, which is connected to an elongated cord 209, which is, in turn, connected to locking member 211. When the handle is moved in the direction of the arrow A, in FIG. 11, the cord 209 is pulled in the direction of the arrow B in FIG. 11. This will move the locking member 211 upwardly as per arrow C in FIG. 9 so that the sheets 201 and 203 will remain locked in that position.

In order to release the sail 3 from that particular locked position, the handle 208 is moved in a direction opposite to the direction of arrow A in FIG. 10.

In operation, a user 19 reclines in the hammock 17 and grasps the handles 4 of the sail. As can be seen, the handles 4 are generally aligned, in their longitudinal and lateral direction, with the longitudinal direction of the hulls 7.

The user 19 can then manipulate the attitude and direction of the sail 3 by manipulating the handles 4, and thereby, the sheets 201 and 203, both for best sailing the wind and for steering purposes. With the user disposed in the hammock 17, the sail craft 1 is much more stable than a similar arrangement wherein the user would be sitting on one of the hulls.

The sail 3 could be fixed in position by the arrangement above-described.

In the event of a crisis condition, if the user is holding the sail 3 in a given attitude or direction by handles 4, he could simply let go of the handles 4 whereupon the sail can be released to assume a stable condition. If the sail was fixed in position, then the user would simply move the handle 208 in a direction opposite to the direction of the arrow A of FIG. 11 to allow the sail 3 to reach equilibrium.

If the crisis is too great for this solution, then the sail can be detached by the quick detachment 170 as illustrated in FIG. 12.

Figure 7:
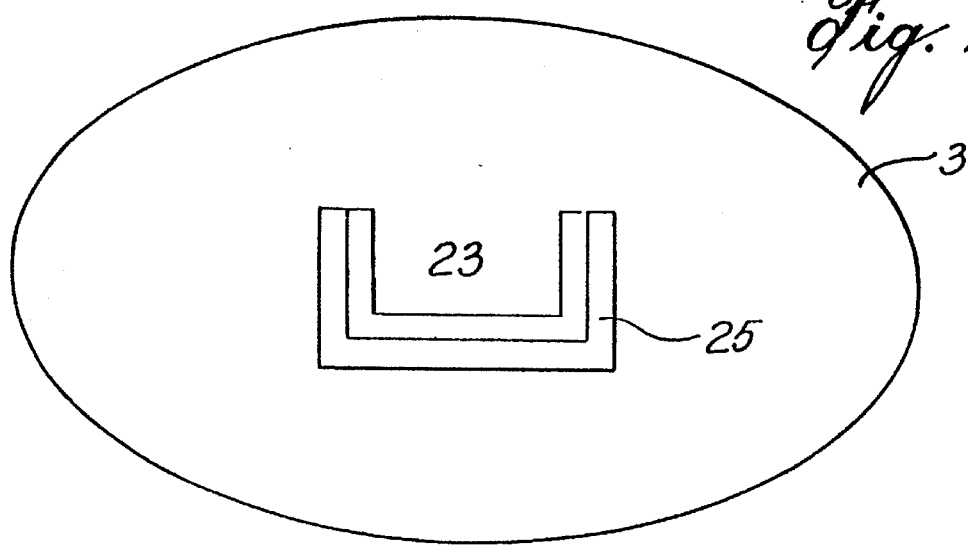
FIG. 7 is a fragmentary enlarged plan view of a detail of the framed sail.
Figure 9:
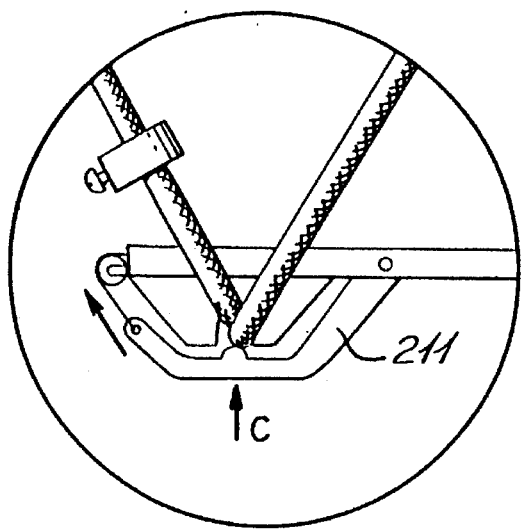
FIG. 9 is a fragmentary enlarged view of a detail of the embodiment shown in FIG. 8.

Crises can also be avoided by allowing the sail 3 to collapse by using the arrangement illustrated in FIG. 7. As seen in FIG. 7, an opening 31 in the sail is covered by a Velcro strip 29 which follows the shape of the opening 31. In the event of a crisis, the Velcro strip 29 would be pulled off so that air would bleed through the sail reducing the force in the sail or depowering the sail.

It is also noted that, the sail 3 can be used to provide protection of the user against the sun.

As the arrangement does not require a heavy mast to support the sail, the pontoons are not pressed downwardly into the water by such a mast so that they can ride virtually on top of the water. In addition, at high enough speeds, the hulls 7 can be lifted so that the arrangement can be used for flying as well as gliding and sailing.

In the illustrated embodiment, the sail craft 1 can be used by only one person. It is possible to make it a multi-person sail craft by either increasing the spacing between hulls and placing more than one hammock between the spaced pontoons, or by lengthening the pontoons and placing two hammocks one after behind the other. Obviously, both the spacing between pontoons and the length of pontoons can be simultaneously increased so that it is possible to have several people across the pontoons and several rows of such several people along the length of the pontoons.

A proposed structural arrangement for forming the frame 5 of the sail 3 is illustrated in FIGS. 12 and 13. As seen in these Figures, the structural arrangement includes four connectors 301A, 301B, 301C and 301D. Each connector connects two arced segments of the entire circular frame to one end of a handle. Thus, connector 301A connects arced segment 303 to arced segment 305 and one end of handle 311. Connector 301B connects arced segment 303 to arced segment 305 and to one end of handle 313. Connector 301C connects arced segment 307 to arced segment 309 and to the other end of handle 313 and connector 301D connects arced segment 309 to arced segment 305 and to the other end of handle 311. Preferably, connecting bar 315 is connected between the center points of the handles 311 and 313.

Each of the arced segments 303, 305, 307 and 309 are of identical size and shapes. The handles 311 and 313 are also of identical size and shapes and the connectors 301A, 301B, 301C and 301D are also of identical size and shapes.

The proposed structure has a good deal of strength and provides a good deal of structural integrity.

Although particular embodiments have been described, this was for the purpose of illustrating, but not limiting, the invention. Various modifications, which will come readily to the mind of one skilled in the art, are within the scope of the invention as defined in the appended claims.

I claim:

1. A sail craft comprising;

at least a pair of elongated bottom members;

a first frame for connecting said bottom members in spaced arrangement;

seat means on said first frame for supporting a user of said sailing arrangement, said seat means for supporting being disposed between and above said bottom members;

a substantially circular framed sail having an endless frame about the periphery thereof;

strut members extend from the endless frame inwardly thereof to provide a connecting member centrally of the sail;

a second frame extending above said first frame and mounting said circular framed sail such that the framed sail is maintained in a generally horizontal attitude, said framed sail being flexibly mounted at said connecting member to the second frame such that the attitude and direction of said sail can be manipulated by said user.

2. A sail craft as defined in claim 1 wherein said bottom members comprise hulls.

3. A sail craft as defined in claim 2 wherein said seat means for supporting the user comprises a hammock located above the hulls and centrally therebetween.

4. A sail craft as defined in claim 1 wherein the first frame comprises a triangular member;

one leg of the triangular member being connected to one of said hulls and the other leg of the triangular member being connected to the other one of said hulls;

the apex of said triangular member being provided with said releasable attachment means for attachment of said triangular member to the connecting member at the center of said framed sail.

5. A sail craft as defined in claim 4 wherein four separate elongated stretchable means are provided with;

each of said four stretchable means having one end detachably attached to a different point on said framed sail;

the other ends of said elongated stretchable means being connected to respective points on respective ones of said pontoons.

6. A sail craft as defined in claim 3 wherein a rudder is mounted to the frame forward of the hammock and control means are associated with the rudder to be manipulated by the feet of a user sitting in the hammock.

7. A sail craft as defined in claim 1 and including a steering arrangement;

said steering arrangement comprising a rudder mounted to the frame between the bottom members;

control means, controlled by the feet of a user, to control the movement of the rudder.

8. A sail craft as defined in claim 7 and including at least a rear fin disposed at the stern of each of said bottom members;

said rear fin being provided as a sailing keel.

9. A sail craft as defined in claim 1 including means for collapsing said framed sail under crisis conditions, said means comprising an opening in said sail covered by a Velcro strip;

whereby, to depower said sail, said Velcro strip is removed from said opening.

10. A sail craft as defined in claim 5 including means for manipulating the direction and attitude of said sail;

said means for manipulating comprising a first sheet extending from one end and one side of said framed sail to the other end and the other side of said framed sail and a second sheet extending from the other end and the one side of said framed sail to the one end and other side of said framed sail;

a hook-like member on the frame below the seat means;

said first and second sheets extending through said hook-like member.

11. A sail craft as defined in claim 5 and including a quick release means for releasing said sail from said triangular member.

12. A sail craft as defined in claim 10 and including means for fixing said first and second sheets in a predetermined position to fix said sail in position.

13. A sail craft as defined in claim 12 wherein said means for fixing comprises a sheet block means.

14. A sail craft as defined in claim 3 and including a seatbelt arrangement for strapping said user into said hammock.

15. A sail craft as defined in claim 3 including an airbag arrangement for supporting said user in said hammock.

16. A sail craft as defined in claim 1 which is a land vehicle and each said bottom member mounts wheels.

17. A sail craft as defined in claim 16 wherein said seat for supporting the user comprises a hammock.

18. A sail craft as defined in claim 1 wherein said framed sail includes a pair of rigid handles forming part of said struts to allow a user, grasping said handles, to manipulate said framed sail.

* * * * *